United States Patent Office 2,709,708
Patented May 31, 1955

2,709,708

PROCESS FOR MANUFACTURE OF HYDROXY-NAPHTHOIC NAPHTHALIDE

Clifford J. Doyle and Thomas Kirkly Storer, Manchester, England, assignors to Imperial Chemical Industries Limited, a corporation of Great Britain No Drawing. Application July 6, 1953,
Serial No. 366,369

Claims priority, application Great Britain July 9, 1952

2 Claims. (Cl. 260—560)

This invention relates to an improved process for the manufacture of a dyestuff intermediate and more particularly to an improved process for the manufacture of 2-hydroxy-3-naphthoic-2'-naphthylamide.

It is well known that 2-hydroxy-3-naphthoic-2'-naphthylamide which is a valuable dyestuff intermediate for use in the azoic process of dyeing, can be manufactured by condensing 2-hydroxy-3-naphthoic acid with beta-naphthylamine in the presence of phosphorus trichloride.

In recent years it has become widely recognized that beta-naphthylamine possesses carcinogenic properties and much care has to be taken to avoid any danger to health arising from the manufacture and use of this compound. However, in spite of all the precautions taken, the manufacture and use of the compound still presented a menace to health and some leading dyestuff manufacturers have accordingly abandoned the manufacture and use of beta-naphthylamine. As a consequence of this it has been necessary for them to abandon the manufacture of the aforementioned valuable dyestuff intermediate.

We have discovered an improved process for the manufacture of the aforementioned valuable dyestuff intermediate which avoids the use of beta-naphthylamine and other dangerous carcinogenic compounds.

According to our invention we provide a process for the manufacture of 2-hydroxy-3-naphthoic-2'-naphthylamide which comprises heating 2-naphthylamine-1-sulphonic acid or a salt thereof with 2-hydroxy-3-naphthoic acid or a salt thereof and phosphorus trichloride in an inert liquid medium.

The heating step is preferably carried out in the presence of an inorganic alkali or alkaline salt and this forms a further feature of our invention.

The 2-naphthylamine-1-sulphonic acid used in the process of our invention is the well known Tobias Acid which can be manufactured by sulphonating beta-naphthol and then replacing the hydroxy group by amino, so that the manufacture of this intermediate does not present any serious health hazards.

The inert liquid medium used in the process of our invention should preferably be an organic liquid which boils above 100° C. In practice a liquid which boils between about 110° C. and 180° C. is found to be convenient. The reaction is preferably carried out at the boiling point of the liquid used as reaction medium.

The 2-hydroxy-3-naphthoic acid may be used as the free acid but in general a mono- or di-alkali metal salt is preferred. The Tobias Acid may be used as the free acid or as an alkali-metal salt. When the alkali metal salts are to be used these may be preformed or formed in situ before addition of the phosphorus trichloride, for example by adding caustic soda solution to the free acid and an inert water-immiscible solvent and then distilling to remove water by azeotropic distillation in the inert water-immiscible solvent.

The inorganic alkali or alkaline salt may be for example trisodium phosphate, sodium carbonate or caustic soda, but in general we have found that disodium hydrogen phosphate is to be preferred because in the presence of this substance, a high yield of product is consistently obtained in commercial manufacture. The disodium hydrogen phosphate may if desired be formed in situ in the reaction mixture.

The time required to complete the reaction will depend largely on the temperature and diluent used. When the reaction is carried out in boiling xylene a reaction time of about 15–25 hours is required to obtain the best yield, although a good yield is obtained with a shorter time, for example about 5 hours.

The reaction product is conveniently isolated by cooling the reaction mixture, adding it to sodium carbonate solution, steam distilling off the inert liquid used as reaction medium, filtering off the solid, washing it alkali-free with water, washing it with acid, and then washing it acid-free with water.

The course of the reaction is not known with certainty but it is believed that the Tobias acid is not desulphated before condensation takes place. As the operatives do not need to handle beta-naphthylamine but only the harmless Tobias acid, the serious danger to health arising from contact with beta-naphthylamine is obviated.

The invention is illustrated but not limited by the following example in which the parts are by weight:

Example 96.3 parts of 2-hydroxy-3-naphthoic acid, 35.5 parts of disodium hydrogen phosphate and 51.8 parts of 45% caustic soda solution are added to 700 parts of xylene. The mixture is stirred and heated to 140° C. and the solvent is allowed to distil off until the distillate is clear and free from water. The mixture is cooled and further xylene is then added if necessary to make up the mixture to 505 parts. 111.5 parts of Tobias acid are added and the mixture is heated to 60° C. 30.5 parts of phosphorus trichloride are added during 1½ hours. The mixture is then heated to 140° C. under a reflux condenser and it is stirred at this temperature for 24 hours.

The reaction mixture is cooled and added to a solution of 30 parts of sodium carbonate in 400 parts of water. The xylene is distilled off and the 2-hydroxy-3-naphthoic-2'-naphthylamide is filtered off, washed with water until the washings are free from alkali, washed with 200 parts of 1% hydrochloric acid and finally washed with water until the washings are free from acid and dried.

What we claim is:

1. A process for the manufacture of 2-hydroxy-3-naphthoic-2'-naphthylamide which comprises heating a material selected from the group consisting of 2-naphthylamine-1-sulphonic acid and alkali metal salts thereof with a material selected from the group consisting of 2-hydroxy-3-naphthoic acid and alkali metal salts thereof in an inert organic liquid boiling above 100° C. in the presence of phosphorus trichloride and disodium hydrogen phosphate.

2. A process as recited in claim 1 in which the inert organic liquid has a boiling point between about 110° C. and 180° C. and the reaction is performed by maintaining the reaction mixture at the boiling point of the said organic liquid.

References Cited in the file of this patent
UNITED STATES PATENTS
2,653,974    Hagenboecker _____ Sept. 29, 1953